Patented Nov. 19, 1935

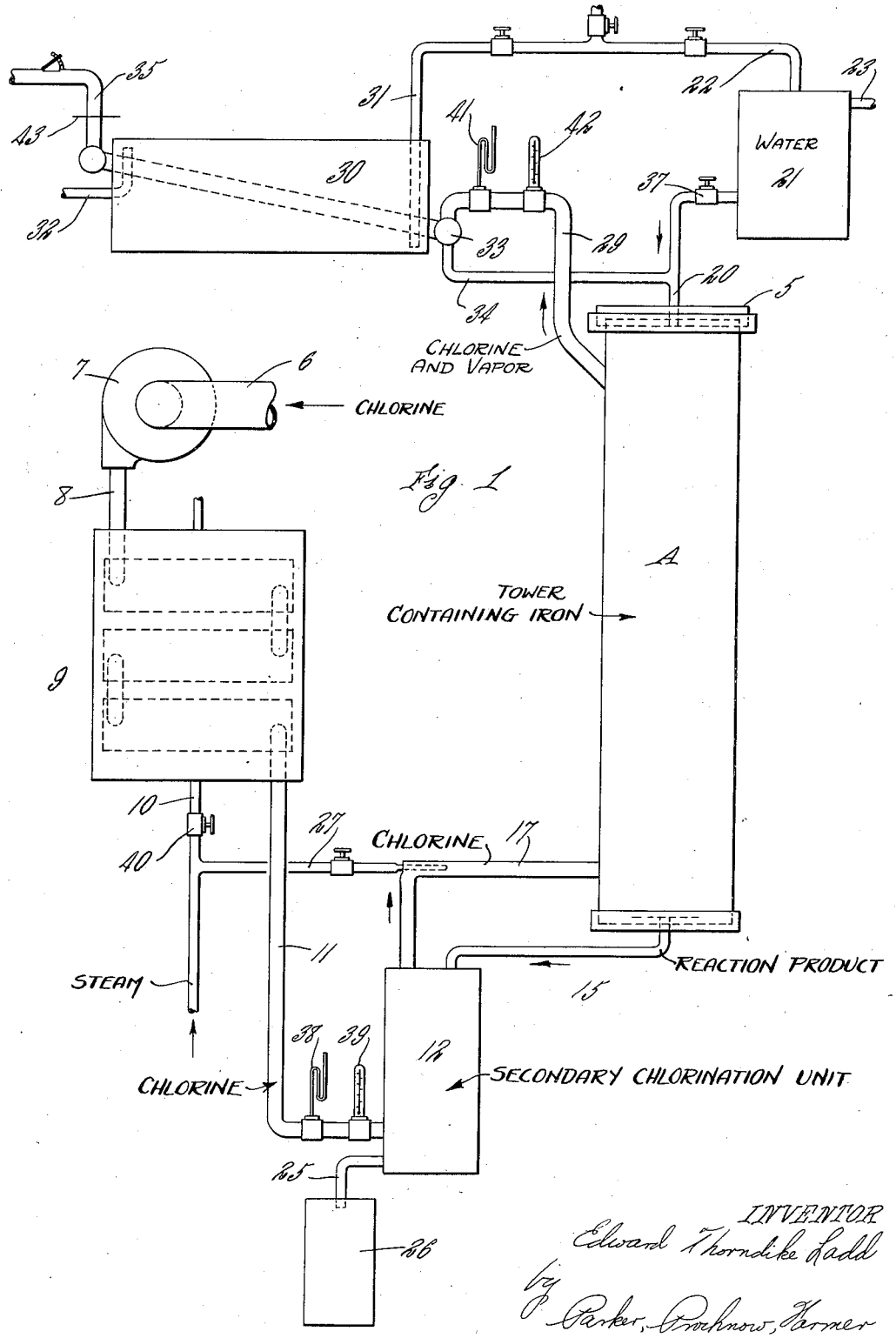
Nov. 19, 1935. E. T. LADD 2,021,791
PROCESS FOR PRODUCING HYDRATED FERRIC CHLORIDE
Filed May 14, 1932

2,021,791

UNITED STATES PATENT OFFICE 2,021,791

PROCESS FOR PRODUCING HYDRATED FERRIC CHLORIDE

Edward Thorndike Ladd, Lewiston Heights, N. Y., assignor to Isco Chemical Company, Inc., Niagara Falls, N. Y.

Application May 14, 1932, Serial No. 611,331

7 Claims. (Cl. 23—87)

This invention relates to processes of manufacturing hydrates of ferric chloride of high concentration.

Ferric chloride forms a series of hydrates of crystalline form and these crystalline forms may contain as high as six molecular parts of water to one of ferric chloride. It has been found by laboratory experiments that there exists between the two crystalline forms containing respectively four and six molecules of water, a hydrate in liquid form containing materially less than six molecules of water. Since ferric chloride is ordinarily manufactured by the reaction of hydrochloric acid on iron, which produces a ferric chloride containing an excess of water above the six molecular parts to one of ferric chloride, a hydrate in liquid form containing less than six molecules of water is not commercially produced, mainly because of difficulty encountered in removing water from the compound after the same has become crystallized with six molecules of water.

The objects of this invention are to provide a process and apparatus by means of which hydrates of ferric chloride containing less than six molecules of water can be produced commercially without evaporation; also to provide a process and apparatus of this kind in accordance with which hydrated ferric chloride containing the desired proportion of water can be produced by controlling the supply of materials to the process; also to provide a process and apparatus of this kind in which a highly concentrated hydrated ferric chloride is produced by the action of chlorine and water on iron; also to improve processes and apparatus of this kind in other respects hereinafter specified.

Briefly stated, my improved process is carried out by reacting upon iron with chlorine and water or steam, and in controlling the proportions of water and chlorine in such a manner as to produce without evaporation a hydrated ferric chloride containing less than six molecules of water. This process further may be used to produce a hydrated ferric chloride containing approximately 4.9 molecular parts of water for each part of ferric chloride, and this particular hydrate remains in liquid form under ordinary atmospheric temperatures. This product is, therefore, valuable because it can be shipped in containers in liquid form, so that it is more easily handled than the crystalline product and occupies less space, and furthermore, because of the higher concentration of ferric chloride than in the case of the hydrate containing six molecular parts of water, which is ordinarily made, shipping costs are lower, since the payment of freight on excess water is avoided. Also the consumer is saved the trouble of making solution of the crystalline ferric chloride.

The accompanying drawing illustrates diagrammatically an apparatus that may be used in the carrying out of this process.

In the drawing, A represents a tower having a top 5 which is removable to permit the tower to be filled with iron, preferably in the form of scrap, so that the iron has a relatively large surface on which the water and chlorine gas may act. The top 5 may form a tight seal with the tower in any suitable manner, for example, by water seal. Chlorine is conducted to the tower from a suitable container through a duct 6 leading to a fan or blower 7 discharging through a duct 8. The chlorine from the fan is preferably passed through a preheater represented diagrammatically at 9, and which may be of any suitable or desired construction, that shown receiving heat from steam conducted to the preheater unit 9 through a passage 10, and contacting within the housing of the preheater with the ducts carrying the chlorine, which are shown in broken lines in the drawing. The chlorine is discharged from the preheater through a duct 11 and enters into a secondary chlorination unit 12 where it acts upon the liquid discharged from the lower end of the tower A through a duct 15. The chlorine gas preferably enters the lower part of the secondary chlorination chamber which is provided with baffles or other means for providing a relatively large surface for conduction of the chlorine gas to the liquid flowing over the baffles. From this secondary chlorination unit, the chlorine gas not used in the chamber 12 is discharged through a duct 17 to the lower portion of the tower A.

Both the tower A and the secondary chlorination unit are preferably formed of any suitable material not affected by the substances passing into and formed in the tower, tile being preferably used for constructing the tower and the secondary chlorination unit and the walls and connections leading to and from these structures are made as air-tight as possible to exclude air from the reaction.

Water is admitted to the tower A preferably near the upper end thereof. In the construction shown, the removable top 5 of the tower is provided with a water inlet 20 through which water may flow at a definite rate from a tank or other water supply 21, the tank shown having a water inlet 22 from a water main or other source of supply and having an overflow 23.

In the operation of the process, the chlorine gas and water react upon the iron in the tower A. Probably in the upper part of the tower a ferrous chloride solution, which may be fairly dilute, is formed and as this solution passes downwardly in the tower, it is constantly in contact with chlorine gas and iron, so that the solution becomes more concentrated and as the solution descends, all or most of the ferrous chloride solution is converted into ferric chloride solution. Upon reaching the bottom of the tower A, the solution flows into the secondary chlorination chamber 12, which may not be essential for the carrying out of this process, but which is used more or less as a safeguard to make certain that all ferrous chloride is converted into ferric chloride by reaction with the warm chlorine gas passing upwardly through the secondary chlorination chamber. Upon reaching the bottom of the secondary chlorination unit 12, the liquor is discharged through a passage or duct 25, and may be collected in any suitable container or crystallizing vat, or the liquor may be passed directly into the shipping containers 26. The proportions of chlorine to water are so controlled throughout the process that approximately the desired quantity of water is present in the final product to each molecule of ferric chloride. For example, in forming the concentrated solution which does not crystallize at ordinary temperatures, the water and chlorine are controlled so that approximately 4.9 molecular parts of water are present for each molecule of ferric chloride. There is, of course, some leeway in that slightly more or less water than the 4.9 molecular parts specified may be used without causing the resulting product to crystallize. In order to control the process, tests may be made of the material discharged through the duct 25 at intervals to determine the water content, and if the water content is too low, steam may be admitted into the passage or duct 17 by means of a branch steam pipe 27 leading from the steam pipe 10.

It will be understood that dilute hydrochloric acid may be introduced at the top of the tower A in cases where such acid is available at low cost and the amount of chlorine required in such cases can be proportionally reduced. The reaction between the water with which the hydrochloric acid is diluted and the iron and chlorine is the same as when water alone is used.

Near the top of the tower a vent duct 29 is preferably provided through which vapors or gases may be discharged from the upper part of the tower. This duct preferably passes on an upward inclination through a condenser 30 cooled, for example, by means of water passing into the condenser through a pipe 31 and overflowing the condenser through a pipe 32. The condensate can be collected in a manifold 33 and discharged through a pipe 34 to the water inlet 20 of the tower. Any gases not condensed are discharged through a vent pipe 35. It will be understood that the drawing illustrates merely one type of apparatus which may be used in connection with the carrying out of this process, but other forms of apparatus may be employed, if desired.

The process described has the advantage that it may be carried on continuously and requires very little attention after the proportions of water and chlorine admitted to the system have been established. The operation of the system can be readily controlled by crystallizing the material discharged from the pipe 25 by cooling to determine its water content, or, if the concentrated solution herein referred to is desired, samples of the liquor discharged through the pipe 25 may be cooled to make sure that no crystallization takes place at ordinary atmospheric temperatures, since such crystallization will take place either if the product contains too much or too little water, since the hydrated ferric chloride formed by this process has the peculiarity of being in a liquid phase between two crystalline phases containing more and less water. The rate of flow of water to the top of the apparatus may be regulated by means of a valve 37 in the water inlet pipe 20, and the amount of chlorine supplied may be determined by the velocity of the fan or blower 7. Further regulation of the chlorine may be effected by means of a pressure gauge 38 in the pipe or duct 11 and a thermometer 39 may be used in connection with the controlling of the temperature of the chlorine entering the reaction chambers of the apparatus, a valve 40 in the steam supply pipe 10 being used to regulate the temperature. In a similar manner the pressure in the gas and vapor discharge duct 29 may be read by means of a gauge 41 and the temperature can be determined by the thermometer 42. The pressure within the tower may be regulated by means of a valve or damper 43 of any suitable form. By using a condenser 30, water discharged from the tower is returned to the same so that no allowance need be made for loss of water through the discharge duct 29.

The process described results in a very efficient production of the desired product, in that the water content can be regulated so as to produce the desired proportion of water, so that evaporation is not required. The process and apparatus described can also be readily operated to produce the hydrate containing approximately 4.9 molecular parts of water, at which concentration the hydrate will remain liquid under all ordinary atmospheric conditions, so that no removal of water from a crystalline form of the ferric chloride is necessary. In making this normally liquid hydrate, the formation of crystals during the process is avoided, so that no plugging of the discharge duct 25 or the formation of solid ferric chloride in the secondary chlorination unit can result, and no interruption of the process will occur from such causes. This normally liquid hydrate contains approximately 66% of ferric chloride while the crystalline product with six molecules of water contains about 60% of ferric chloride, and if solutions of this crystalline product are formed, the ferric chloride content will be still further reduced. Since ferric chloride is ordinarily used commercially in the form of relatively dilute solutions, the user of the material can effect very considerable saving in freight and container cost by purchasing the concentrated solution resulting from this process, and in addition, the user has the advantage that the necessity of making a solution of a crystalline product is avoided.

I claim as my invention:

1. A process of producing ferric chloride, including acting on iron with water and chlorine in a container containing iron, introducing water and chlorine gas into the container, the water and chlorine being introduced in such porportion as to produce a solution containing approximately 4.9 molecules of water per molecule of ferric chloride, and withdrawing the ferric chloride from the container.

2. A process of forming ferric chloride solutions, including acting upon iron with water and chlorine to form a liquor, withdrawing the liquor out of contact with the iron, subjecting said liquor to steam to increase the water content thereof to approximately 4.9 molecules of water per molecule of ferric chloride, and then subjecting the liquor to the action of chlorine gas to convert any ferrous chloride in said liquor to ferric chloride.

3. A process of producing ferric chloride, including admitting water to the top of a reaction chamber containing iron, admitting chlorine to the lower portion of said chamber, discharging liquor collecting in the bottom of said chamber, and adding steam to the lower part of said reaction chamber to raise the water content of the liquor to a point at which said liquor will remain in liquid form at ordinary temperatures and will contain less than six molecular parts of water for each molecular part of ferric chloride.

4. A process of making concentrated hydrated ferric chloride containing at least 60% of ferric chloride, which includes acting on iron with water and chlorine gas at an elevated temperature, and regulating the amounts of ingredients supplied to the reaction in such a manner that the reaction product is a solution of ferric chloride containing at least 60% ferric chloride.

5. A process of making concentrated hydrated ferric chloride containing at least 60% of ferric chloride, which includes acting on iron with water and chlorine gas at an elevated temperature, adding water to the reaction in quantities only sufficient to produce a reaction product in the form of a solution containing not more than six molecules of water per molecule of iron chloride, withdrawing the solution thus produced out of contact with iron, and then acting upon the same with chlorine gas.

6. A process of making hydrated ferric chloride containing at least 60% of ferric chloride, which includes acting on iron with water and chlorine gas at an elevated temperature, increasing the concentration of the resulting material by acting on the same with iron in the presence of chlorine gas without additional water until a reaction product is obtained which contains not more than six molecules of water per molecule of iron chloride.

7. A process of making hydrated ferric chloride containing at least 60% of ferric chloride, which includes acting on iron with water and chlorine gas at an elevated temperature, increasing the concentration of the resulting material by acting on the same with iron in the presence of chlorine gas without additional water, until a reaction product is obtained which contains not more than six molecules of water per molecule of iron chloride, and finally acting on said reaction product with chlorine gas without the presence of iron to convert any ferrous chloride in the material into ferric chloride.

EDWARD THORNDIKE LADD.